United States Patent [19]

Koike et al.

[11] 4,412,930
[45] Nov. 1, 1983

[54] HEAT-STORING COMPOSITION

[75] Inventors: Keiichi Koike, Matsudo; Michio Yanadori, Hachioji, both of Japan

[73] Assignees: Hitachi, Ltd.; Hitachi Plant Engineering and Construction Co., Ltd., both of Tokyo, Japan

[21] Appl. No.: 356,921

[22] Filed: Mar. 10, 1982

[30] Foreign Application Priority Data

Mar. 13, 1981 [JP] Japan .................................. 56-35192

[51] Int. Cl.³ ............................................... C09K 3/18
[52] U.S. Cl. ..................................... 252/70; 562/607; 165/10; 165/104.17; 165/DIG. 4; 126/400
[58] Field of Search ........................... 252/70; 562/607

[56] References Cited
U.S. PATENT DOCUMENTS 2,315,425  3/1943  Hill et al. ............................... 252/70

FOREIGN PATENT DOCUMENTS 51-87480  7/1976  Japan .
53-14173  2/1978  Japan .

OTHER PUBLICATIONS

Tang, C. and McLean, J., "Determination of the Overall Dissociation Constants of the Group IA Acetates and Perchlorates in Glacial Acetic Acid," *Inorg. Chem.*, 1981, 20, 2652-2655.

*Primary Examiner*—John E. Kittle
*Assistant Examiner*—Robert A. Wax
*Attorney, Agent, or Firm*—Antonelli, Terry & Wands

[57] ABSTRACT

A heat-storing composition comprising acetic acid and at least one of sodium acetate, ammonium acetate, potassium acetate and calcium acetate works at a desired temperature in a temperature range of 5°–20° C. and is chemically stable with a high heat-storing capacity.

9 Claims, 5 Drawing Figures

FIG. I

HEAT-STORING COMPOSITION

BACKGROUND OF THE INVENTION

The present invention relates to a heat-storing composition for coolers.

Heretofore, water or a two-phase mixture of water and ice has been used as a heat-storing material for a cooler. A cooler using water as a heat-storing material has such a disadvantage as necessity for using a larger heat-storing vessel because the heat-storing capacity is as small as 1 cal/cm$^{3\circ}$ C. owing to the use of the sensible heat of water (specific heat change in temperature). On the other hand, where ice is used as a heat-storing material, the heat-storing capacity can be increased owing to the use of the latent heat of fusion, but the vaporization temperature of a coolant in the heat exchanger in the heat-storing vessel becomes lower than the zero degree, i.e. the freezing point of ice, considerably reducing the refrigeration capacity.

That is, the efficiency of a refrigerator for use in a cooler of heat-storing type is considerably lowered below 0° C., and thus working at a temperature range of 5°–20° C. is desirable for efficient heat storing. It is known that other heat-storing materials working in that temperature range other than water are benzene (melting point: 6° C.), formic acid (melting point: 10.8° C.), acetic acid (melting point: 16.7° C.) etc., but these materials have not been practically used because of chemical unstability, corrosiveness, inflammability, etc.

SUMMARY OF THE INVENTION

An object of the present invention is to provide a novel heat-storing composition capable of undergoing solidification and melting in a specific temperature range in which the melting point is easily adjustable to a desired one, for example, even to 0.5° C. by adjusting the amount of additive or additives, which is high in heat-storing capacity per unit weight as a heat-storing material for coolers and chemically stable, hardly inflammable and less corrosive to a metallic material.

The present invention provides a heat-storing composition comprising acetic acid having a purity of at least 98% and at least one of potassium acetate, calcium acetate, sodium acetate and ammonium acetate.

The present invention will be described in detail below, referring to the drawings.

DESCRIPTION OF THE PREFERRED EMBODIMENTS

Pure acetic acid has a melting point of 16.7° C. The present inventors have found that, when sodium acetate, potassium acetate, calcium acetate, ammonium acetate, etc. are added alone or together to acetic acid, the melting point of the resulting mixture is lowered and further that the melting point can be adjusted to a desired one by adjusting the amount of an additive, or additives.

Figure 1:
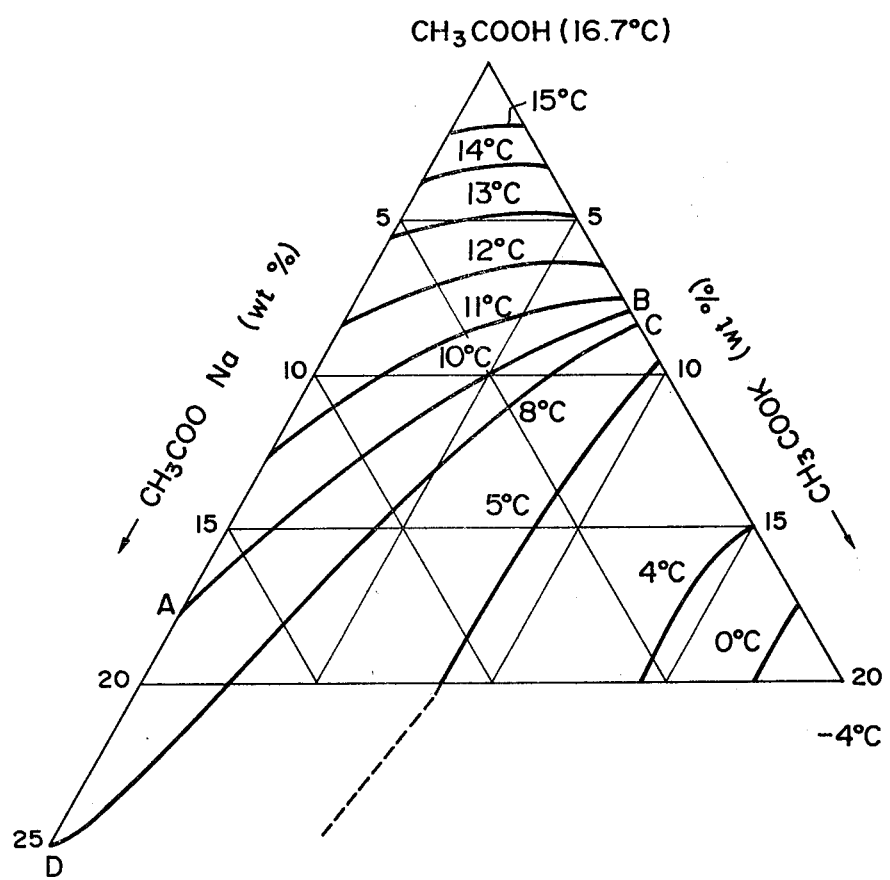
FIG. 1 is a ternary phase diagram showing changes in melting point when sodium acetate and potassium acetate are added alone or together to acetic acid, where the acetates are based on the anhydrous form.

For example, in FIG. 1, addition of 17.5% by weight of sodium acetate or addition of 8% by weight of potassium acetate makes the melting point of the resulting mixtures 10° C., the acetates being based on the anhydrous form. Simultaneous addition, for example, addition of 5% by weight of sodium acetate and 5% by weight of potassium acetate makes the melting point 10° C., the acetates being based on the anhydrous form. In FIG. 1, the area enclosed by curved lines A–B and C–D and straight lines B–C and D–A has a melting point of 8°–10° C.

Figure 2:
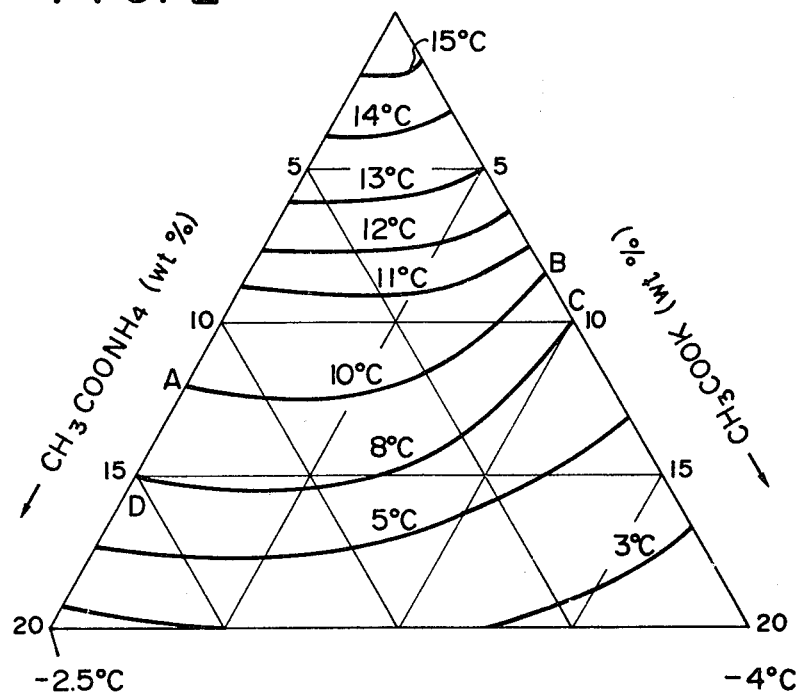
FIG. 2 is a ternary phase diagram showing changes in melting point when ammonium acetate and potassium acetate are added alone or together to acetic acid, where the acetates are based on the anhydrous form.
Figure 3:
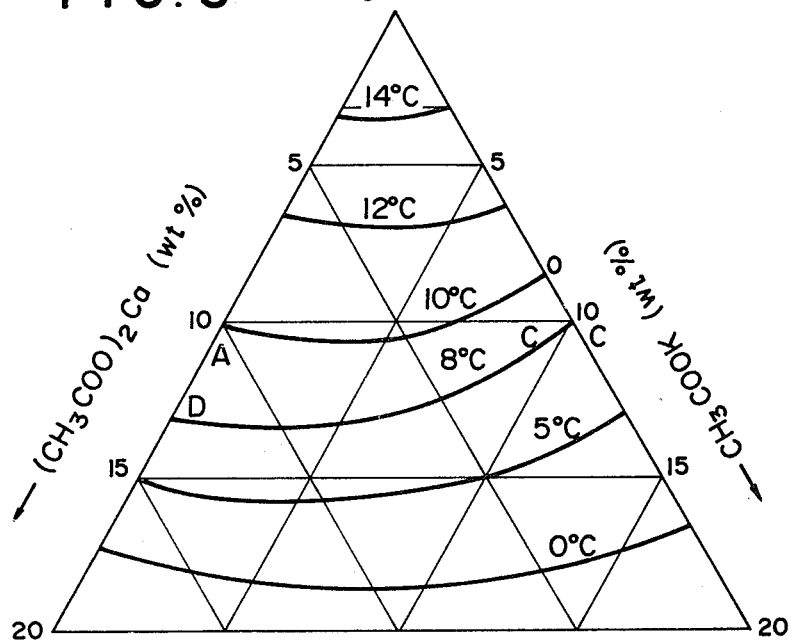
FIG. 3 is a ternary phase diagram showing changes in melting point when calcium acetate and potassium acetate are added alone or together to acetic acid, where the acetates are based on the anhydrous form.

In FIG. 2, addition of 12.3% by weight of ammonium acetate makes the melting point of the resulting mixture 10° C., and simultaneous addition thereof with potassium acetate produces a heat-storing composition having a melting point of 8°–10° C. as in the area enclosed by lines A–B–C–D–A in FIG. 2, the acetates being based on the anhydrous form. This is also true of single or simultaneous addition of calcium acetate and potassium acetate in FIG. 3. The melting point of mixtures of acetic acid can be adjusted to a desired one by adjusting the amount of an additive or additives in accordance with FIGS. 1–3.

The melting point of acetic acid depends upon its purity. For example, industrial grade acetic acid having a purity of 99% (glacial acetic acid) has a melting point of 15° C. Even with such industrial grade acetic acid, the melting point of the resulting mixtures by addition of sodium acetate, potassium acetate, ammonium acetate, and calcium acetate alone or together (all the acetates being in the anhydrous form) lowers in substantially equal proportion to that of pure acetic acid, and thus the melting point of such mixtures can be predicted from the degree of melting point lowering in FIGS. 1–3, if the melting point of acetic acid to be used is measured in advance. For example, in FIG. 1 addition of 9% by weight of sodium acetate (anhydrous) lowers the melting point of pure acetic acid, 16.7° C., to 11° C., melting point of the resulting mixture, where the degree of melting point lowering is 16.7° C.–11° C. = 5.7° C., and when acetic acid having a melting point of 15° C. is used, the melting of the resulting mixture by the same addition will be 15°–5.7° C. = 9.3° C. Even with acetic acid of low purity, for example, glacial acetic acid or industrial grade acetic acid, a heat-storing composition capable of undergoing solidification and melting at a desired temperature can be obtained in this manner. That is, a heat-storing composition capable of undergoing solidification and melting at a specific temperature can be readily obtained from mixtures of acetic acid and acetates.

The present heat-storing composition is stable against supercooling, separation into two phases, etc., but the property of the composition depends upon the species of the acetates as the additive. Characteristics of acetates as additives will be described below one by one.

Potassium acetate has the most distinguished function to lower the melting point. For example, the amounts thereof for obtaining a melting point of 5° C. and that of 10° C. by single addition thereof are 9.5% by weight and 8% by weight, respectively, on the basis of anhydrous form. Calcium acetate has the effect upon the melting point lowering, which is next to that of potassium acetate. The amounts thereof for obtaining a melting point of 5° C. and that of 10° C. by single addition are 15.5% by weight and 10% by weight, respectively, on the basis of anhydrous form. Ammonium acetate has less remarkable function of lowering the melting point than calcium acetate, but has an effect of promoting crystallization in the presence of another acetate and preventing supercooling. The amounts thereof for obtaining a melting point of 5° C. and that of 10° C. by single addition thereof are 17.5% by weight and 12.2% by weight, respectively, on the basis of anhydrous form. The effect of sodium acetate upon the melting point lowering is the smallest, and 17.5% by weight and 25% by weight thereof must be added to lower the melting point of pure acetic acid, 16.7° C., to 10° C. and 8° C., respectively, on the basis of anhydrous form. A composition having a melting point of 5° C. cannot be obtained by single addition of sodium acetate, and simultaneous addition of another acetate is required. However, sodium acetate has a particularly large effect upon occasioning the solidification and melting at a constant temperature, and also has an effect upon increasing the heat-storing capacity per unit volume, since the solidified composition has a large density.

A composition containing a small amount of the acetate having a distinguished function of lowering the melting point has properties similar to those of pure acetic acid, but a composition will be less inflammable and less corrosive with increasing amount of acetate. It is desirable to select acetates as the additive to acetic acid for desired purposes. To obtain a low melting-solidification point, it is preferable to add acetate having a remarkable function of lowering the melting point, for example, potassium acetate, chiefly to acetic acid. On the other hand, to conduct solidification and melting at a constant temperature or to make a composition hardly inflammable or chemically non-reactive (less corrosive), it is preferable to add sodium acetate chiefly to acetic acid. Needless to say, other acetates can be added thereto simultaneously, whereby a composition with improved stability can be more readily prepared. In the case of simultaneous addition, the amounts of single additives are reduced, and even addition of small amounts of additives can lower the melting point in accordance with their mixing proportions. However, the lower limit amount of any species, in which the effect is remarkable upon the melting point lowering, is 0.05% by weight in the present invention, on the basis of anhydrous form. That is, the melting point is lowered by 0.05°–0.1° C. by addition of 0.05% by weight of any species on the basis of anhydrous form. On the other hand, an upper limit amount of an additive, though it depends upon its solubility in acetic acid and the degree of melting point lowering, is the amount of the additive when the resulting heat-storing composition has a melting point of 3° C., except for sodium acetate. Sodium acetate has a saturation solubility of 27%, which is dominant and thus is applied as the upper limit amount of sodium acetate. The melting point 3° C. of a heat-storing composition is a practical limit temperature for heating storing in refrigerators.

Pure acetic acid has the heat of fusion of 46.2 cal/g and the density of 1.05, which change with the amount of acetate as the additive to acetic acid. For example, when 10% by weight of sodium acetate is added to acetic acid on the basis of anhydrous form, the heat of fusion will be 50.1 cal/g, the density being 1.15. The heat of fusion, 50.1 cal/g, corresponds to 57.6 cal/ml by unit conversion, which is obviously larger than 10 cal/ml, that is, the heat-storing capacity of water as a heat-storing material when used in heat absorption and heat release in a temperature range of 5°–15° C.

Figure 4:
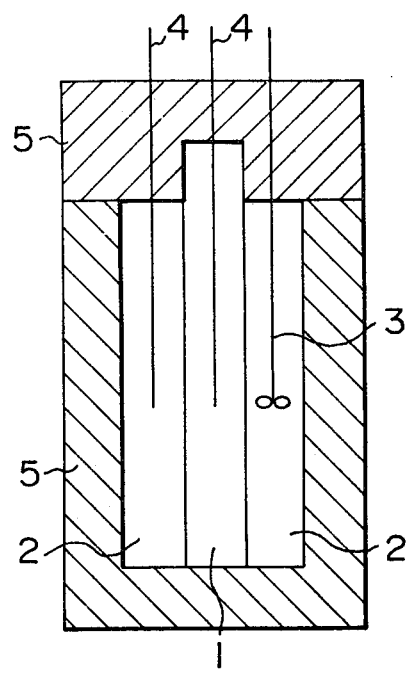
FIG. 4 is a schematic cross-sectional view of a simulator test apparatus for heat-storing material.

In FIG. 4, numeral 1 is a heat-storing compartment filled with a heat-storing composition, numeral 2 a heat-exchanging water compartment, numeral 3 is a stirrer, numeral 4 a temperature sensor, and numeral 5 a heat insulator.

Figure 5:
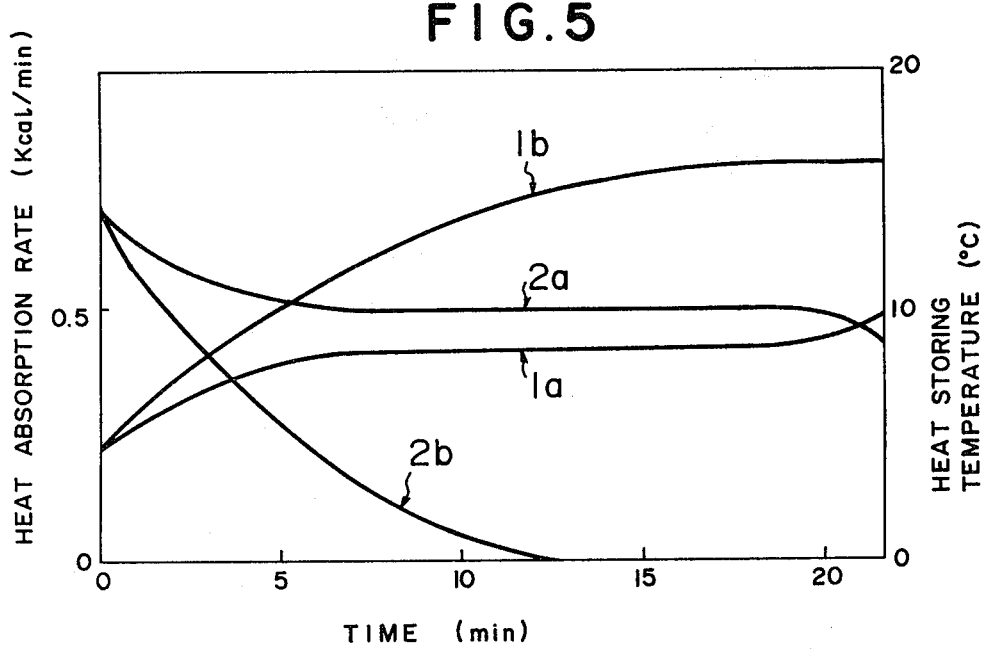
FIG. 5 is a diagram showing changes in temperature with time in a heat-exchange water compartment when a ratio by volume of a heat-storing compartment to the heat-exchanging water compartment is 1:5 in the simulator test apparatus of FIG. 4.

In FIG. 5, changes in temperature of heat-exchanging water compartment with time is shown in the simulator test apparatus of FIG. 4 in a ratio by volume of the heat-storing compartment 1 to the heat-exchanging water compartment 2 of 1:5, where a mixture of industrial grade acetic acid and sodium acetate (15% by weight on the basis of anhydrous form) is solidified and kept at 5° C. in the heat-storing compartment 1 in advance while the heat-exchange water compartment 2 is kept at 20° C. with stirring, and changes in temperature with time are measured. Curves 1a and 1b show changes in temperature with time in the heat-storing compartment with the present heat-storing composition as mentioned above and water as the heat-storing material for comparison, respectively, and curves 2a and 2b show heat absorption rates of the present heat-storing composition as mentioned above and water for comparison, obtained from changes in temperature with time in the heat-exchanging water compartment 2, respectively.

As is obvious from curve 2a, a high heat absorption rate can be obtained by release of the latent heat of fusion of the present heat-storing composition, and the present heat-storing composition is very effective for heat exchange in a temperature range of 5°–20° C.

Examples of the present invention will be described below.

Compositions of industrial grade acetic acid (melting point: 15.2° C.) containing sodium acetate, potassium acetate, ammonium acetate, and calcium acetate were prepared to measure their melting points. Results are shown in Table. The melting points were constant even after repetitions of solidification and melting.

TABLE

| Acetic acid (part by weight) | Additive (part by weight on the basis of anhydrous form) | Melting point (°C.) |
| --- | --- | --- |
| $CH_3COOH$ (100) | $CH_3COONa$ (17.5) | 8.5 |
| " | $CH_3COONa$ (5) $CH_3COOK$ (5) | 8.5 |
| " | $CH_3COOK$ (7) | 9.0 |
| " | $CH_3COOK$ (6) $CH_3COONH_4$ (5) | 9.0 |
| " | $CH_3COONH_4$ (12) | 9.0 |

TABLE-continued

| Acetic acid (part by weight) | Additive (part by weight) on the basis of anhydrous form) | Melting point (°C.) |
| --- | --- | --- |
| " | $CH_3COONH_4$ (5) $(CH_3COO)_2Ca$ (6) | 8.5 |
| " | $(CH_3COO)_2Ca$ (5.5) $CH_3COOK$ (5) | 8.5 |
| " | $(CH_3COO)_2Ca$ (5) $CH_3COONa$ (6) | 8.5 |
| " | $(CH_3COO)_2Ca$ (5) $CH_3COONH_4$ (6) | 9.0 |
| " | $(CH_3COO)_2Ca$ (3) $CH_3COOK$ (4) $CH_3COONa$ (5) | 8.0 |
| " | $(CH_3COO)_2Ca$ (3) $CH_3COONH_4$ (4) $CH_3COONa$ (3) | 8.0 |
| " | $(CH_3COO)_2Ca$ (9) | 8.5 |
| " | $CH_3COONa$ (5) $CH_3COONH_4$ (6) | 9.0 |
| " | $CH_3COOK$ (8.5) | 5.0 |
| " | $CH_3COOCa$ (10) $CH_3COOK$ (6) | 5.0 |

What is claimed is:

1. A heat-storing composition which comprises acetic acid and one of ammonium acetate and calcium acetate in an amount sufficient to cause the melting point of the composition to be lower than that of acetic acid.

2. A heat-storing composition which comprises acetic acid and sodium acetate, wherein said sodium acetate is in an amount of 2-27% by weight on the basis of anhydrous form.

3. A heat-storing composition which comprises acetic acid and ammonium acetate, wherein said ammonium acetate is in an amount of 0.05-18% by weight on the basis of anhydrous form.

4. A heat-storing composition which comprises acetic acid and potassium acetate, wherein said potassium acetate is in an amount of 2-15% by weight on the basis of anhydrous form.

5. A heat-storing composition which comprises acetic acid and calcium acetate, wherein said calcium acetate is in an amount of 0.05-17% by weight on the basis of anhydrous form.

6. A heat-storing composition, which comprises acetic acid and at least two of sodium acetate, ammonium acetate, potassium acetate, and calcium acetate.

7. The heat-storing composition according to claim 6, wherein the sodium acetate and potassium acetate are in amounts of 0.05-27% by weight and 0.05-15% by weight, respectively, on the basis of anhydrous form.

8. The heat-storing composition according to claim 6, wherein the ammonium acetate and the potassium acetate are in amounts of 0.05-18% by weight and 0.05-15% by weight, respectively, on the basis of anhydrous form.

9. The heat storing composition according to claim 6, wherein the potassium acetate and the calcium acetate are in amounts of 0.05-17% by weight and 0.05-15% by weight, respectively, on the basis of anhydrous form.

* * * * *